United States Patent
Virdhagriswaran et al.

(10) Patent No.: US 7,774,655 B2
(45) Date of Patent: Aug. 10, 2010

(54) METHOD AND SYSTEM FOR RETRIEVING TIME SERIES DATA

(75) Inventors: Sankar Virdhagriswaran, Boxborough, MA (US); John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 728 days.

(21) Appl. No.: 11/687,118

(22) Filed: Mar. 16, 2007

(65) Prior Publication Data

US 2008/0225738 A1    Sep. 18, 2008

(51) Int. Cl.
*G06F 11/00* (2006.01)
(52) U.S. Cl. .............................. 714/44; 714/25; 714/26; 714/47; 700/80; 700/110; 702/183
(58) Field of Classification Search ................ 714/25, 714/26.44, 47; 700/80, 110; 702/183
See application file for complete search history.

(56) References Cited

U.S. PATENT DOCUMENTS

| | | | | |
|---|---|---|---|---|
| 3,882,305 A | * | 5/1975 | Johnstone | .................... 702/183 |
| 4,754,409 A | * | 6/1988 | Ashford et al. | ............... 706/10 |
| 6,535,865 B1 | * | 3/2003 | Skaaning et al. | ............... 706/52 |
| 7,225,245 B2 | * | 5/2007 | Gurumoorthy et al. | ...... 709/223 |
| 2003/0079011 A1 | * | 4/2003 | Schilling et al. | ............. 709/224 |
| 2003/0200134 A1 | * | 10/2003 | Leonard et al. | ............... 705/10 |
| 2007/0239753 A1 | * | 10/2007 | Leonard | ...................... 707/101 |
| 2008/0170507 A1 | * | 7/2008 | Handley et al. | .............. 370/242 |
| 2008/0225738 A1 | * | 9/2008 | Virdhagriswaran et al. | ... 370/252 |
| 2009/0132626 A1 | * | 5/2009 | Ide | .............................. 708/443 |
| 2009/0216700 A1 | * | 8/2009 | Bouchard et al. | ............. 706/46 |

OTHER PUBLICATIONS

Smith, T.F. et al., "Identification of Common Molecular Subsequences", Journal of Molecular Biology, 1981, vol. 147, pp. 195-197.

* cited by examiner

*Primary Examiner*—Emerson C Puente
(74) *Attorney, Agent, or Firm*—Pepper Hamilton LLP

(57) ABSTRACT

Systems and methods for analyzing time series data are disclosed. A query including a machine variable identifier may be received. The machine variable identifier may include an identifier pertaining to one or more of a state, a condition and a performance measure for a printer. A first time series data entry may be determined based on the query. The first time series data entry may include a data value and a time entry for the machine variable identifier. One or more second time series data entries may be selected based on the data value associated with the first time series data entry. One or more maintenance operations may be performed based on the one or more second time series data entries.

18 Claims, 5 Drawing Sheets

METHOD AND SYSTEM FOR RETRIEVING TIME SERIES DATA

BACKGROUND

1. Technical Field

The present disclosure generally relates to systems and methods for retrieving time series data used to perform data analysis. More particularly, the present, disclosure relates to systems and methods for retrieving time series data pertaining to machine variables matching one or more specified criteria.

2. Background

Service departments or organizations that service electronic machines often use diagnostic information generated by such machines to perform fault detection and analysis. The diagnostic information may be collected using sensors or other recording mechanisms within the machine to generate various data, such as operating conditions and performance characteristics.

Fault detection and analysis is commonly performed using such diagnostic information. In most cases, fault analysis is performed either at the customer site by field engineers or at the service department if the customer brought or sent the machine for service. In either case, a service engineer examines the diagnostic information in an attempt to determine the cause of the fault.

One problem with performing fault analysis in this manner is that the service engineer only has access to a limited amount of information regarding the cause of the fault. For example, the service engineer might only have access to the latest diagnostic information that is stored on the machine. Even if time series data is present for the diagnostic information, the service engineer likely is only able to analyze a single time series of diagnostic information at a time.

Some machines have been provided with data network connections so that diagnostic information pertaining to a machine's internal state can be periodically transmitted to a data warehouse for storage. However, analyzing the data in the data warehouse to determine meaningful information can be difficult.

In addition, storing time series data in an organized way may be problematic. For example, because the number of variables for which data is stored for each machine could be quite large and the amount of time series data continuously grows, existing database tables may not be able to store all values in a single table in which, for example, each row of the database corresponds to a single time stamp and each column represents a particular code.

Moreover, current database structures do not adequately permit both point queries in which a search is performed to find values corresponding to a value in a different time period and range queries in which all values within a predefined time range are matched with a particular value.

Furthermore, comparisons of data across a plurality of time series based on determining a correlation between the time series cannot be performed using conventional database structures.

Systems and methods for enabling a user to find similarities between patterns for multiple machine variables and using such similarities to assist in fault analysis of a machine in real time would be desirable.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "code" is a reference to one or more codes and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a method of analyzing time series data obtained from one or more printers may include receiving a query comprising a machine variable identifier that includes an identifier pertaining to one or more of a state, a condition and a performance measure for a printer, determining a first time series data entry, including a data value and a time entry for the machine variable identifier, based on the query, selecting one or more second time series data entries based on the data value associated with the first time series data entry, and performing one or more maintenance operations based on the one or more second time series data entries.

In an embodiment, a method of analyzing time series data obtained from one or more printers may include receiving a query comprising a machine variable identifier that includes an identifier pertaining to one or more of a state, a condition and a performance measure for a printer, determining a first time series data stream, including a plurality of data values and a corresponding time entry for each data value for the machine variable identifier, based on the query, for each of one or more second time series data streams, determining a similarity measurement for the second time series data stream with respect to the first time series data stream, determining one or more most closely matching time series data streams having the best similarity measurements with respect to the first time series data stream, and performing one or more maintenance operations based on the one or more most closely matching time series data streams.

In an embodiment, a system for performing a search of time series data obtained from one or more printers may include a processor, a processor-readable storage medium in communication with the processor, and a communications interface in communication with the processor. The processor-readable storage medium may contain one or more programming instructions for performing a method of performing a search of time series data obtained from one or more printers. The method may include receiving a query comprising a machine variable identifier that includes an identifier pertaining to one or more of a state, a condition and a performance measure for a printer, determining a first time series data entry, including a data value and a time entry for the machine variable identifier, based on the query, selecting one or more second time series data entries based on the data value associated with the first time series data entry, and performing one or more maintenance operations based on the one or more second time series data entries.

In an embodiment, a system for determining most closely matching time series data obtained from one or more printers may include a processor, a processor-readable storage medium in communication with the processor, and a communications interface in communication with the processor. The processor-readable storage medium may contain one or more programming instructions for performing a method of determining most closely matching time series data obtained from one or more printers. The method may include receiving a query comprising a machine variable identifier that includes an identifier pertaining to one or more of a state, a condition and a performance measure for a printer, determining a first time series data stream, including a plurality of data values and a corresponding time entry for each data value for the machine variable identifier, based on the query, for each of one or more second time series data streams, determining a similarity measurement for the second time series data stream with respect to the first time series data stream, determining one or more most closely matching time series data streams having the best similarity measurements with respect to the first time series data stream, and performing one or more maintenance operations based on the one or more most closely matching time series data streams.

BRIEF DESCRIPTION OF THE DRAWINGS

Aspects, features, benefits and advantages of the present invention will be apparent with regard to the following description and accompanying drawings, of which.

DETAILED DESCRIPTION

Figure 1:
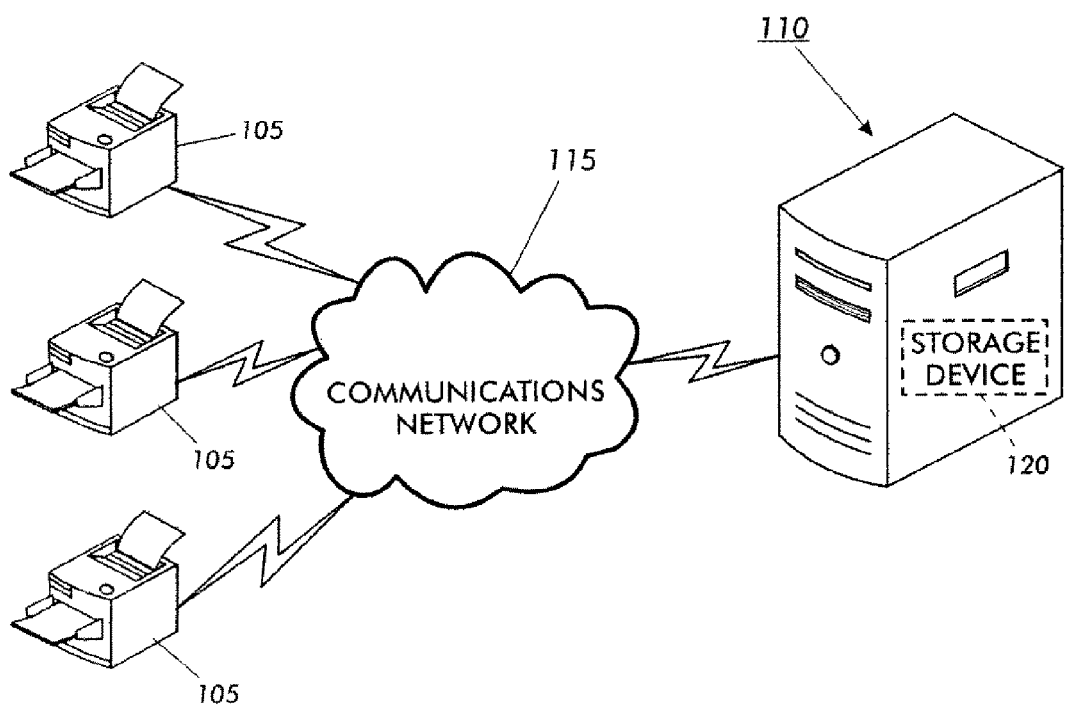
FIG. 1 depicts an exemplary system for retrieving and analyzing time series data according to an embodiment.

The term "machine" refers to a device used to perform an operation. Exemplary machines include print engines and other document processing devices, such as printers, scanners, facsimile machines and/or the like. A machine includes a plurality of machine variables ("codes") for which data is stored over time. Each code represents a machine state, condition and/or performance measure for the machine. Exemplary codes may include, without limitation, page counts, a number of document requests, machine uptime or downtime, machine component operating conditions (such as temperature, humidity, etc.), and the like. For some machines, such as the DocuColor™ DC7000 and DC8000 digital presses provided by Xerox Corporation, data values may be stored for as many as approximately 9000 codes. It will be apparent to one of ordinary skill in the art that data entries for more or fewer codes may also be stored for a particular machine within the scope of the present disclosure.

A "printer" refers to a device used to perform a printing operation. Exemplary printers include black and white, color, laser, photo and inkjet printing devices, printing systems, such as the 4110™ Enterprise Printing Systems produced by Xerox Corporation, production systems, such as the Xerox Nuvera® Digital Production Systems produced by Xerox Corporation, production presses, such as the iGen3® Digital Production Presses and the DocuColor™ Digital Presses produced by Xerox Corporation, plotters, wide format printing devices and the like.

The term "time series data" refers to data collected over time. Time series data can pertain to data received over time for a particular machine variable or code. Time series data includes at least a time entry, such as a day, hour, minute, second and/or other time interval at which data is collected, and a corresponding data value recorded for each time entry. The data value may represent a particular machine state that is operative at the corresponding time entry, such as, for example and without limitation, a machine's internal temperature. Alternately, the data value may represent a value that accumulated since the previous time entry, such as, for example and without limitation, a number of operations performed by the machine, such as pages printed by a printer. The data value may be represented in a numerically coded format. In other words, each data value may represent an integer value or a fractional value. If no data is available for a particular time entry, a designation that no data was received may be substituted for the data value.

A "maintenance operation" refers to an operation performed by an individual with respect to a machine. A maintenance operation can include any operation directed to repairing, replacing, modifying, adjusting and/or utilizing a component of a machine or a machine. A maintenance operation can include a modification to a hardware component and/or a software component. For example, a maintenance operation can include replacing a particular hardware component of a machine, such as a fuser roll. Alternately, a maintenance operation can include downloading software to a machine that replaces or supplements previously installed software. Additional and/or alternate maintenance operations can be performed within the scope of this disclosure as will be apparent to those of ordinary skill in the art.

The Extensible Markup Language (XML) is a general-purpose markup language for creating special-purpose markup languages, which are capable of describing many different kinds of data. XML documents use text to describe and apply a tree-based structure to information. All information is represented by text, interspersed with markup or "tags" indicating the information's separation into a hierarchy of character data, container-like elements and attributes of those elements. XML facilitates the sharing of data across different systems, such as systems connected via a computer network, such as the Internet and/or an intranet.

FIG. 1 depicts an exemplary system for retrieving and analyzing time series data according to an embodiment. Time series data for a plurality of codes may be received from one or more machines 105, such as printers, at a central server system 110 via a communications network 115, such as the Internet, an intranet and/or the like. The central server system 110 may include a storage device 120 used to store the received time series data. The storage device 120 may store the time series data using, for example, an XML-based database structure where time series data is stored based on a machine serial number unique to each machine 105. A machine serial number can be an alphanumeric code, a symbol based code, a binary code or any other identifier that uniquely identifies a machine 105. In an embodiment, a particular data value may be associated with the serial number for the machine 105 from which it was received and a time entry denoting when the data value was received. The database in the storage device 120 may be queried to extract time series data that pertains to each machine 105 and each code or machine variable.

In an embodiment, one or more printers 105 may provide data for a plurality of codes representing fault conditions and/or machine state conditions to a central server system 110 on a periodic basis. Each set of data provided by each printer 105 may include a timestamp denoting the time at which the data was collected or transmitted. The central server system 110 may store the received information in a storage device 120 using a database structure that permits searching based on one or more query types. The data may be organized, for example, on a code-by-code basis for each printer 105.

If a fault occurs on a particular printer 105, time series data for that printer may be analyzed to determine possible causes for the fault. In an embodiment, the time series data may be compared with previously recorded time series data for which known faults occurred. If a match is found, a user may determine that a fault corresponding to the matching time series data occurred on the printer 105. As such, the time series data may be useful in performing fault analysis. Such fault analysis may result in one or more maintenance operations being performed based on the particular fault that is identified.

In addition, time series data may be useful in preventing faults from occurring. For example, if the time series data for a particular code on printers 105 that fail according to a known fault exhibit particular behavior in advance of failing, other printers may be analyzed to determine whether such behavior is exhibited. If so, preventative maintenance operations may be performed in advance of a failure. Alternatively, if time series data pertaining to a consumable resource in a printer 105 denotes that the resource is about to be extinguished, an alert may be provided to enable replacement of the resource prior to extinguishment. Other maintenance operations may also be performed using the teachings of the present disclosure as will be apparent to those of ordinary skill in the art.

Time series data for a particular code may include an array containing time entries and data values such as is shown in Table 1 below. Data values may have a value of "NA" when no data is present for the corresponding time entry. Although time entries are shown in Table 1 on a daily basis, data values received at any time interval may be stored in a database within the scope of the present disclosure as will be apparent to one of ordinary skill in the art.

TABLE 1

| TIME ENTRY | DATA VALUE |
|---|---|
| "2006-10-01" | 7205 |
| "2006-10-02" | 7203 |
| "2006-10-03" | 7201 |
| "2006-10-04" | NA |
| "2006-10-05" | NA |
| "2006-10-06" | 7200 |
| "2006-10-07" | 7200 |
| "2006-10-08" | 7199 |
| "2006-10-09" | 7198 |
| "2006-10-10" | 7199 |
| "2006-10-11" | 7199 |
| "2006-10-12" | NA |
| "2006-10-13" | 7200 |
| "2006-10-14" | 7197 |
| "2006-10-15" | NA |
| "2006-10-16" | 7197 |
| "2006-10-17" | 7200 |
| "2006-10-18" | NA |
| "2006-10-19" | NA |
| "2006-10-20" | 7199 |
| "2006-10-21" | NA |
| "2006-10-22" | 7197 |
| "2006-10-23" | 7198 |

For some machines 105, less than all codes may exhibit changes over time. Time series which do not exhibit changes are described herein as "constant time series." Codes exhibiting changes are described herein as "non-constant time series." In an embodiment, constant time series may not be considered when evaluating a similarity measure. In an embodiment, the central server system 110 may only receive non-constant time series from a machine 105.

Different queries may be performed on the time series data stored in the database. Exemplary query types may include point queries, range queries and similarity queries. Such queries are discussed in detail hereinbelow.

Figure 2:
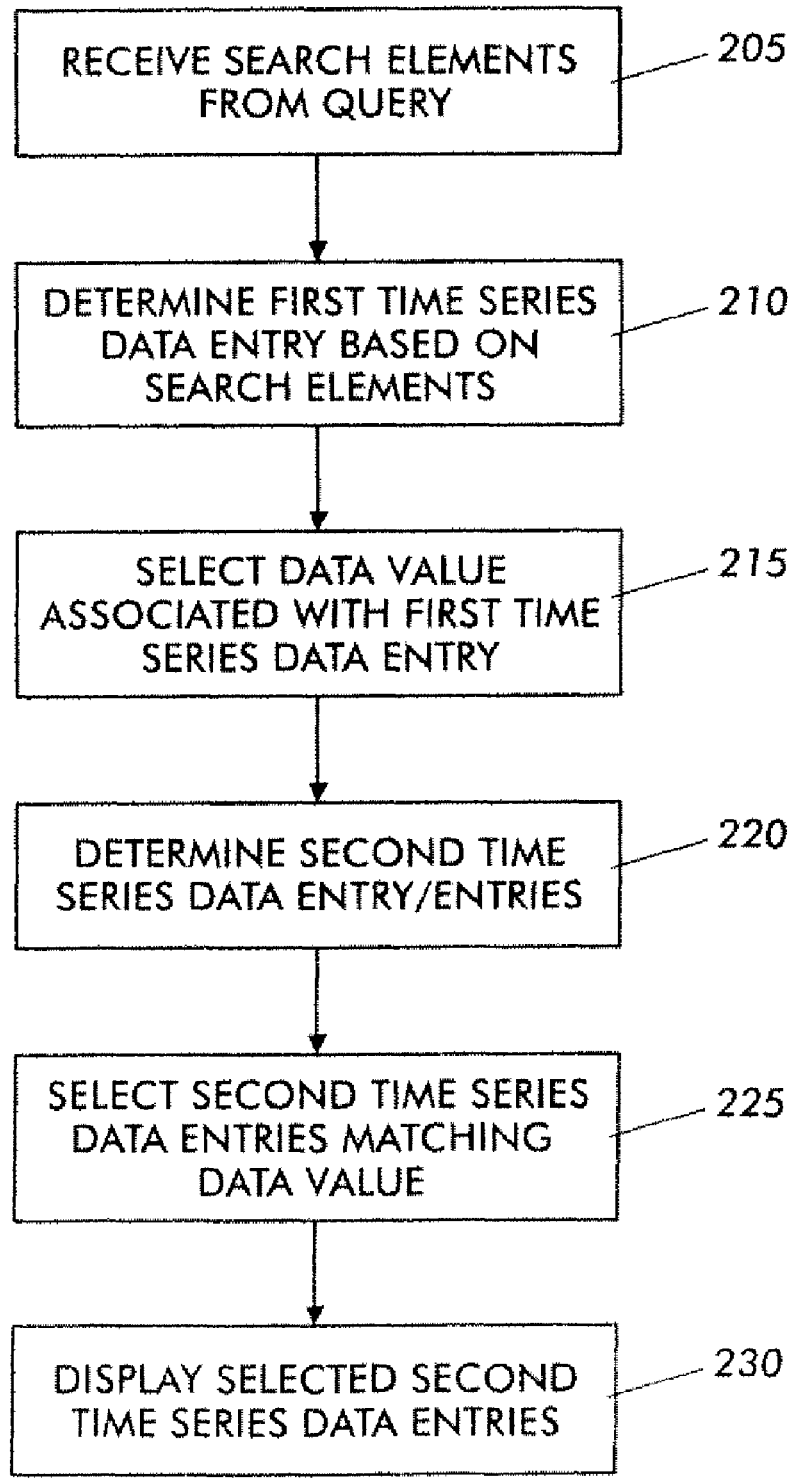
FIG. 2 depicts a flow diagram for an exemplary method of performing a point query according to an embodiment.

FIG. 2 depicts a flow diagram fox an exemplary method of performing a point query according to an embodiment. A point query may be used to find all data points that match a particular data entry based on one or more parameters. For example, the point query <query serial-no="WWW788074" code="760-810" Time="Jan. 1, 2006"/> may extract all values for code 760-810 on machine serial number WWW788074 that have the same value as such code on such machine on Jan. 1, 2006. An exemplary response to the above point query is shown in Table 2.

TABLE 2

| MC Serial No | Code | Query Time Period | Response Time Period | Response Value |
|---|---|---|---|---|
| WWW788074 | 760-810 | Jan. 1, 2006 | Jan. 8, 2006 | −20 |
| WWW788074 | 760-810 | Jan. 1, 2006 | Jan. 12, 2006 | −20 |
| WWW788074 | 760-810 | Jan. 1, 2006 | Feb. 8, 2006 | −20 |
| WWW788074 | 760-810 | Jan. 1, 2006 | Mar. 12, 2006 | −20 |

In contrast, the point query <query serial-no"*" code="760-810" Time="Jan. 1, 2006"/> may extract values for code 760-810 from all machines that have the same value as such code on a particular machine (in this case, WWW788074) on Jan. 1, 2006. An exemplary response to the above point query is shown in Table 3.

TABLE 3

| MC Serial No | Code | Query Time Period | Response Time Period | Response Value |
|---|---|---|---|---|
| WWW788074 | 760-810 | Jan. 1, 2006 | Jan. 8, 2006 | −20 |
| WWW788074 | 760-810 | Jan. 1, 2006 | Jan. 12, 2006 | −20 |
| WWW788074 | 760-810 | Jan. 1, 2006 | Feb. 8, 2006 | −20 |
| WWW788074 | 760-810 | Jan. 1, 2006 | Mar. 12, 2006 | −20 |
| WWW788062 | 760-810 | Jan. 1, 2006 | Jan. 12, 2006 | −20 |
| WWW788062 | 760-810 | Jan. 1, 2006 | Mar. 12, 2006 | −20 |
| ... | ... | ... | ... | ... |

As depicted in FIG. 2, a query, including one or more search elements, may be received 205. Each search element may include, for example and without limitation, a machine identifier, a code identifier (i.e., a machine variable identifier), a time entry or the like. The search elements may be used to determine a data value for comparison by determining 210 a first time series data entry corresponding to the search elements and selecting 215 the data value associated with the first time series data entry. One or more second time data entries for which to search for matching data values may then be determined 220. For example, only time data entries for particular codes, produced by particular machines and/or the like may be compared. One or more second time data entries having data values matching the data value associated with the first time series data entry may then be selected 225. One or more selected second time data entries may then be displayed 230, for example, to a user.

Alternate point queries may also be performed within the scope of this disclosure as will be apparent to those of ordinary skill in the art. For example, point queries that determine time series data entries having one or more particular values, occurring on one or more particular days, and the like may be performed within the scope of this disclosure.

In an embodiment, time series data to permit point queries may be stored in an XML-based data structure, such as the following:

```
<NVMTimeSeriesCollection>
    <NVMTimeSeries>
        <Machine ID>machineID1</MachineID>
        <SerialNo>serialNo1</SerialNo>
        <NVMValue>
            <TimeStamp>timestamp1</TimeStamp>
            <Value>value1</Value>
        </NVMValue>
        <NVMValue>
            <TimeStamp>timestamp2</TimeStamp>
            <Value>value2</Value>
        </NVMValue>
        ...
    </NVMTimeSeries>
    <NVMTimeSeries>
        <Machine ID>machineID2</MachineID>
        <SerialNo>serialNo2</SerialNo>
        <NVMValue>
            <TimeStamp>timestamp1</TimeStamp>
            <Value>value1</Value>
        </NVMValue>
        <NVMValue>
            <TimeStamp>timestamp2</TimeStamp>
            <Value>value2</Value>
        </NVMValue>
        ...
    </NVMTimeSeries>
    ...
</NVMTimeSeriesCollection>
```

Figure 3:
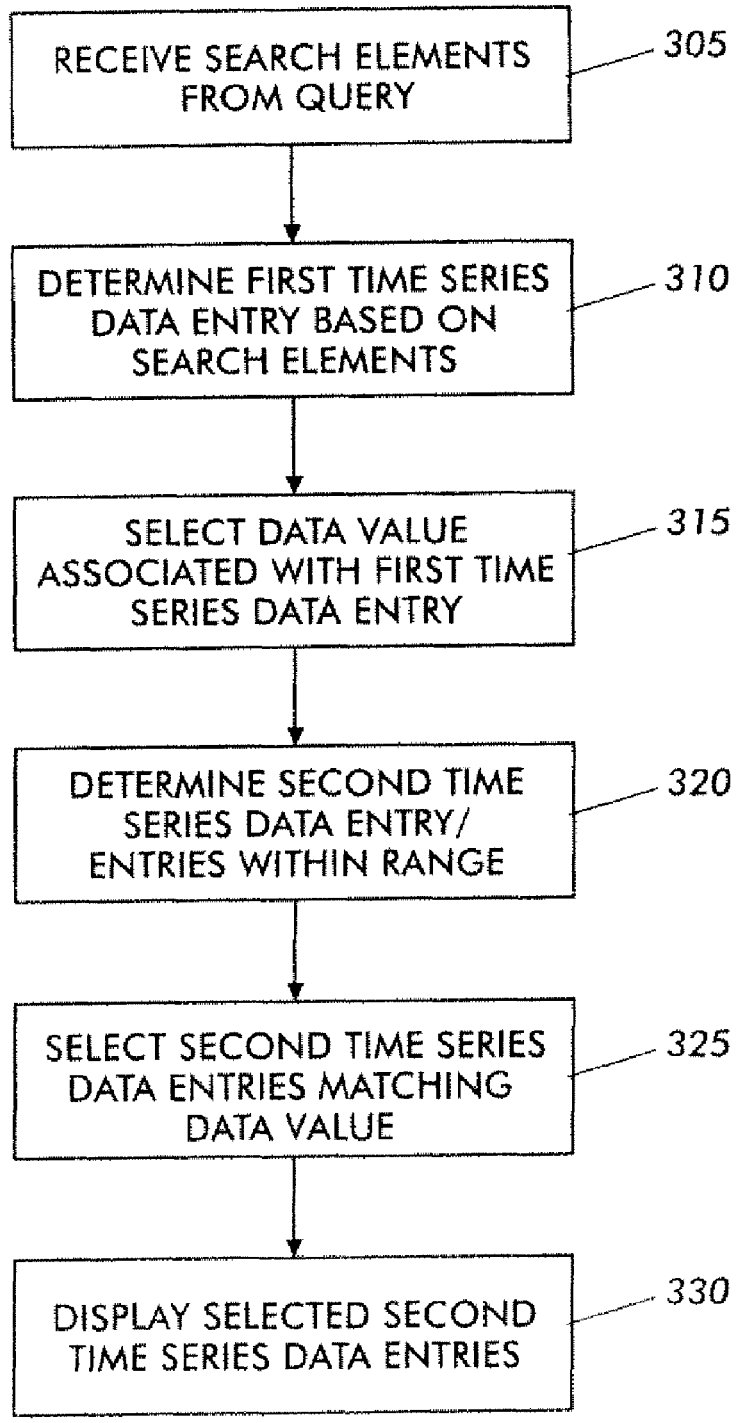
FIG. 3 depicts a flow diagram for an exemplary method of performing a range query according to an embodiment.

FIG. 3 depicts a flow diagram for an exemplary method of performing a point query according to an embodiment. A range query may be used to find all data points that match a particular data entry based on one or more parameters including a specified range. For example, the range query <query serial-no="WWW788074" code="760-810" Time="Jan. 1, 2006 "BeginTime="Feb. 1, 2006" EndTime="Apr. 1, 2006"/> may extract all values for code 760-810 on machine serial number WWW788074 that have the same value as such code on such machine on Jan. 1, 2006 and that occurred between Feb. 1, 2006 and Apr. 1, 2006. An exemplary response to the above range query is shown in Table 4.

TABLE 4

| MC Serial No | Code | Query Time Period | Response Time Period | Response Value |
| --- | --- | --- | --- | --- |
| WWW788074 | 760-810 | Jan. 1, 2006 | Feb. 8, 2006 | −20 |
| WWW788074 | 760-810 | Jan. 1, 2006 | Mar. 12, 2006 | −20 |

As depicted in FIG. 3, a query, including one or more search elements, may be received 305. Each search element may describe, for example and without limitation, a machine identifier, a code identifier, a time entry or the like. In addition, a range query may include a beginning time entry and an ending time entry defining a range of lime entries over which to search. The search elements may be used to determine a data value for comparison by determining 310 a first time series data entry corresponding to the search elements and selecting 315 the data value associated with the first time series data entry. One or more second time data entries for which to search for matching data values may then be determined 320. For example, only time data entries within the specified time entry range, for particular codes, produced by particular machines and/or the like may be compared. One or more second time data entries having data values matching the data value associated with the first time series data entry may then be selected 325. One or more selected second time data entries may then be displayed 330, for example, to a user.

Alternate range queries may also be performed within the scope of this disclosure as will be apparent to those of ordinary skill in the art. For example, range queries that seek response values within a specified range, machine serial numbers within a specified range, and the like may be performed within the scope of this disclosure.

In an embodiment, data to support range queries may be organized in one or more ranges. The range information may include an expression that, when evaluated, returns appropriate time series data corresponding to the range. In an embodiment, time series data to permit range queries may be stored in an XML-based data structure, such as the following:

```
<NVMTimeSeriesCollection>
    <NVMTimeSeries>
        <Machine ID>machineID1</MachineID>
        <SerialNo>serialNo1</SerialNo>
        <NVMValueSummary beginTime="timestamp1"
        endTime="timestampN">expression
        <NVMValueSummary>
            <NVMValue>
                <TimeStamp>timestamp1</TimeStamp>
                <Value>value1</Value>
            </NVMValue>
            ...
            <NVMValue>
                <TimeStamp>timestampN<Timestamp>
                <Value>valueN</Value>
            </NVMValue>
        </NVMValueSummary>
        <NVMValueSummary beginTime="timestampN+1"
        endTime="timestampN+M">
            expression
        <NVMValueSummary>
            <NVMValue>
                <TimeStamp>timestampN+1</TimeStamp>
                <Value>value1</Value>
            </NVMValue>
            ...
            <NVMValue>
                <TimeStamp>timestampN+M</TimeStamp>
                <Value>valueM</Value>
            </NVMValue>
        </NVMValueSummary>
        ...
    </NVMTimeSeries>
    <NVMTimeSeries>
        <Machine ID>machineID2</MachineID>
        <SerialNo>serialNo2</SerialNo>
        <NVMValueSummary beginTime="timestamp1"
        endTime="timestampN">expression
        <NVMValueSummary>
            <NVMValue>
                <TimeStamp>timestamp1</TimeStamp>
                <Value>value1</Value>
            </NVMValue>
            ...
            <NVMValue>
                <TimeStamp>timestampN</TimeStamp>
                <Value>valueN</Value>
            </NVMValue>
        </NVMValueSummary>
        <NVMValueSummary beginTime="timestampN+1"
        endTime="timestampN+M">
            expression
        <NVMValueSummary>
            <NVMValue>
                <TimeStamp>timestampN+1</TimeStamp>
                <Value>value1</Value>
            </NVMValue>
            ...
            <NVMValue>
                <TimeStamp>timestampN+M</TimeStamp>
```

-continued

```
            <Value>valueM</Value>
        </NVMValue>
    </NVMValueSummary>
        ...
    </NVMTimeSeries>
        ...
</NVMTimeSeriesCollection>
```

The term, "similarity measure" refers to a process used to determine a value (a "similarity measurement") representing the similarity between at least two time series data ranges. Exemplary similarity measures may include, without limitation, correlations, dynamic time warping, longest, common subsequence, compression distance measure and the Smith-Waterman algorithm.

The term "closest matching" when used in reference to a time series data stream, code and/or machine variable, refers to a time series data stream, code and/or machine variable having a best similarity measurement for a particular similarity measure out of a plurality of time series data streams, codes and/or machine variables.

Figure 4:
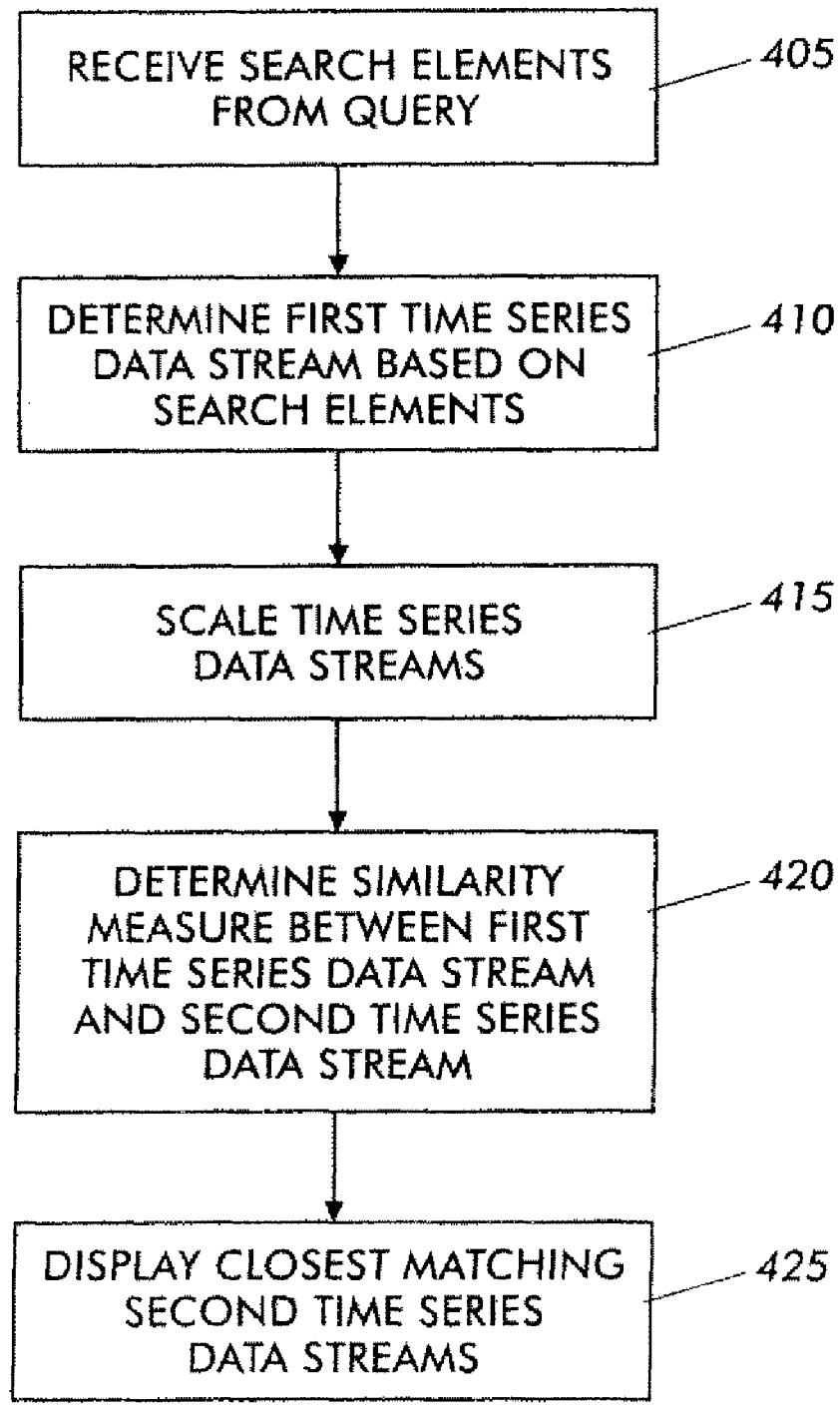
FIG. 4 depicts a flow diagram for an exemplary method of performing a similarity query according to an embodiment.

FIG. 4 depicts a flow diagram for an exemplary method of performing a point query according to an embodiment. A similarity query may determine time series data streams that most closely match a specified time series data stream. A similarity comparison may be performed using a similarity measure. In an embodiment, time series data streams may be scaled prior to evaluating a similarity measure. In an embodiment, the similarity comparison may be performed for time series data within a range.

A similarity query may return one or more closest matching time series data streams. Similarity (or, conversely, difference) may be determined based on, for example, whether data values for the two time series are equal over time or whether data values for the two time series change by proportionate amounts between time entries. In an embodiment, a list of the n closest matching codes may be determined by calculating pairwise similarity measurements using a similarity query.

In an embodiment, the similarity query <similar serialno="WWW788074" code="760-810"/> may evaluate a similarity measure for the time series data corresponding to code 760-810 on machine serial number WWW788074. An exemplary response to the above range query is shown in Table 5.

TABLE 5

| Serial No  | Code    | Machine ID | Similar Code | Similarity Value |
|------------|---------|------------|--------------|------------------|
| WWW788074  | 760-810 | 17302936   | 751-018      | 1.0000           |
| WWW788074  | 760-810 | 17302936   | 760-097      | 1.0              |
| WWW788074  | 760-810 | 17302936   | 751-003      | 0.9999           |
| WWW788074  | 760-810 | 17302936   | 751-004      | 0.9999           |
| WWW788074  | 760-810 | 17302936   | 751-002      | 0.9999           |
| WWW788074  | 760-810 | 17302936   | 760-152      | 0.9994           |
| WWW788074  | 760-810 | 17302936   | 760-151      | 0.9994           |
| WWW788074  | 760-810 | 17302936   | 721-208      | 0.9983           |
| WWW788074  | 760-810 | 17302936   | 760-693      | 0.9971           |

As depicted in FIG. 4, a query, including one or more search elements, may be received 405. The search elements may describe, for example and without limitation, a machine identifier, a code identifier or the like. The search elements may be used to determine 410 a first time series data stream against which one or more second time series data streams may be evaluated. In an embodiment, second time series data streams may be required to be produced by the same machine as the first time series data stream. Alternately, second time series data streams may be produced by a different machine than the machine that produced the first time series data stream. The first and second time series data streams may be scaled 415, and a similarity measure may be used to determine 420 the similarity measurement between the first time series data stream and a second time series data stream. One or more second time series data streams that most closely match the first time series data stream may be displayed 425. In an embodiment, a plurality of second time series data streams may be displayed 425 in order from most similar to least similar. In an embodiment, less than all second time series data streams may be displayed 425 to a user. For example, only second time series data streams having a similarity measurement that exceeds a similarity threshold may be displayed. Alternately and/or additionally, only up to a specified number of second time series data streams may be displayed 425 to a user.

Alternate similarity queries may be performed within the scope of this disclosure as will be apparent to those of ordinary skill in the art. For example, similarity queries that only compare time series data values within a specified range may be performed within the scope of this disclosure.

In an embodiment, time series data to permit similarity queries may be stored in an XML-based data structure, such as the following:

```
<NVMTimeSeriesCollection>
    <NVMTimeSeries>
        <Machine ID>machineID1</MachineID>
        <Code>code1</Code>
        <SerialNo>serialNo1</SerialNo>
        <SimilarityValue>
            <CompareCode>code2</CompareCode>
            <Value>value1</Value>
        </SimilarityValue>
        <SimilarityValue>
            <CompareCode>code3</CompareCode>
            <Value>value2</Value>
        </SimilarityValue>
        ...
    </NVMTimeSeries>
    <NVMTimeSeries>
        <Machine ID>machineID1</MachineID>
        <Code>code2</Code>
        <SerialNo>serialNo1</SerialNo>
        <SimilarityValue>
            <CompareCode>code1</CompareCode>
            <Value>value1</Value>
        </SimilarityValue>
        <SimilarityValue>
            <CompareCode>code3</CompareCode>
            <Value>value2</Value>
        </SimilarityValue>
        ...
    </NVMTimeSeries>
        ...
</NVMTimeSeriesCollection>
```

The above data structure shows time series data entries for a single machine. However, time series data entries for a plurality of machines may be stored in a single data structure. In addition, alternate data structures for storing similarity information will be apparent to those of ordinary skill in the art based on this disclosure.

In an embodiment, one or more of a point query, a range query and a similarity query may be combined. For example, a similarity query may be performed only within a specified time range. Other query combinations and other query types will be apparent to those of ordinary skill in the art based on the teachings of this disclosure.

Figure 5:
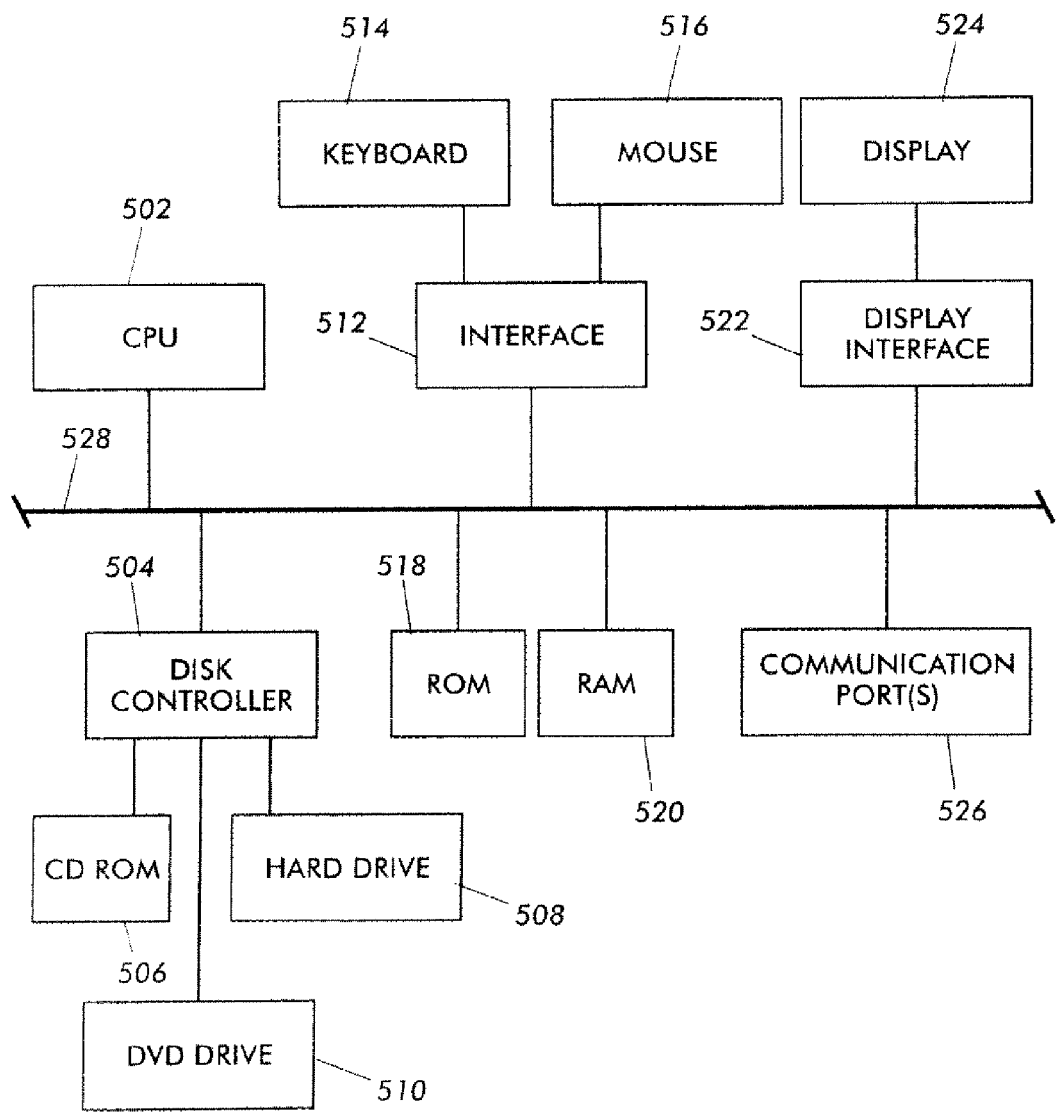
FIG. 5 is a block diagram of exemplary hardware that may be used to contain and/or implement program instructions according to an embodiment.

FIG. 5 is a block diagram of exemplary hardware that may be used to contain and/or implement program, instructions according to an embodiment. Referring to FIG. 5, a bus 528 serves as the main information highway interconnecting the other illustrated components of the hardware. CPU 502 is the central processing unit of the system, performing calculations and logic operations required to execute a program. Read only memory (ROM) 518 and random access memory (RAM) 520 constitute exemplary memory devices.

A disk controller 504 interfaces with one or more optional disk drives to the system bus 528. These disk drives may include, for example, external or internal DVD drives 510, CD ROM drives 506 or hard drives 508. As indicated previously, these various disk drives and disk controllers are optional devices.

Program instructions may be stored in the ROM 518 and/or the RAM 520. Optionally, program instructions may be stored on a computer readable medium such as a compact disk or a digital disk or other recording medium, a communications signal or a carrier wave.

An optional display interface 522 may permit information from the bus 528 to be displayed on the display 524 in audio, graphic or alphanumeric format. Communication with external devices, such as machines 105, may occur using various communication ports 526. An exemplary communication port 526 may be attached to a communications network 115, such as the Internet or an intranet.

In addition to the standard computer-type components, the hardware may also include an interface 512 which allows for receipt of data from input devices such as a keyboard 514 or other input device 516 such as a remote control, pointer and/or joystick.

An embedded system, such as a sub-system within a xerographic apparatus, may optionally be used to perform one, some or all of the operations described herein. Likewise, a multiprocessor system may optionally be used to perform one, some or all of the operations described herein.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of analyzing time series data obtained from one or more printers, the method comprising:
   receiving, by a processor, a query comprising a machine variable identifier and a range defined by a beginning time and an ending time, wherein the machine variable identifier comprises an identifier pertaining to one or more of a state, a condition and a performance measure for a printer;
   determining, via the processor, a first time series data entry based on the query, wherein the first time series data entry comprises a data value and a time entry for the machine variable identifier;
   determining, via the processor, at least one second time series data entry;
   selecting, via the processor, one or more second time series data entries within the range based on the data value associated with the first time series data entry; and
   performing one or more maintenance operations based on the one or more selected second time series data entries.

2. The method of claim 1 wherein the query further comprises a machine identifier.

3. The method of claim 2 wherein the at least one second time series data entry is produced by a printer identified by the machine identifier.

4. The method of claim 1 wherein the at least one second time series data entry is stored in an Extensible Markup Language (XML) based data structure.

5. A method of analyzing time series data obtained from one or more printers, the method comprising:
   receiving, by a processor, a query comprising a machine variable identifier, wherein the machine variable identifier comprises an identifier pertaining to one or more of a state, a condition and a performance measure for a printer;
   determining, via the processor, a first time series data stream based on the query, wherein the first time series data stream comprises a plurality of data values and a corresponding time entry for each data value for the machine variable identifier;
   determining, via the processor, at least one second time series data stream;
   for each of one or more second time series data streams, determining, via the processor, a similarity measurement for the second time series data stream with respect to the first time series data stream;
   determining, via the processor, one or more most closely matching time series data streams, wherein the most closely matching time series data streams comprise the second time series data streams having the best similarity measurements with respect to the first time series data stream; and
   performing one or more maintenance operations based on the one or more most closely matching time series data streams.

6. The method of claim 5, further comprising:
   scaling data values associated with the time series data entries of the first time series data stream.

7. The method of claim 5, further comprising:
   scaling data values associated with the time series data entries of each second time series data stream.

8. The method of claim 5 wherein the query further comprises a range defined by a beginning time and an ending time, and wherein determining at least one second time series data stream comprises determining at least one second time series data stream within the range.

9. The method of claim 5 wherein the query further comprises a machine identifier.

10. The method of claim 9 wherein the at least one second time series data entry is produced by a printer identified by the machine identifier.

11. The method of claim 5 wherein the at least one second time series data entry is stored in an Extensible Markup Language (XML) based data structure.

12. A system for analyzing time series data obtained from one or more printers, the system comprising:
   a processor;
   a processor-readable storage medium in communication with the processor; and
   a communications interface in communication with the processor,
   wherein the processor-readable storage medium contains one or more programming instructions for performing a method of analyzing time series data obtained from one or more printers, the method comprising:
      receiving a query comprising a machine variable identifier and a range defined by a beginning time and an ending time, wherein the machine variable identifier comprises an identifier pertaining to one or more of a state, a condition and a performance measure for a printer, determining a first time series data entry based on the query, wherein the first time series data entry comprises a data value and a time entry for the machine variable identifier, determining at least one second time series data entry, selecting one or more second time series data entries within the range based on the data value associated with the first time series data entry, and performing one or more maintenance operations based on the one or more selected second time series data entries.

13. The system of claim 12 wherein the at least one second time series data entry is stored in an Extensible Markup Language (XML) based data structure in the processor-readable storage medium.

14. A system for analyzing time series data obtained from one or more printers, the system comprising:

a processor;

a processor-readable storage medium in communication with the processor; and a communications interface in communication with the processor, wherein the processor-readable storage medium contains one or more programming instructions for performing a method of analyzing time series data obtained from one or more printers, the method comprising:

receiving a query comprising a machine variable identifier, wherein the machine variable identifier comprises an identifier pertaining to one or more of a state, a condition and a performance measure for a printer, determining a first time series data stream based on the query, wherein the first time series data stream comprises a plurality of data values and a corresponding time entry for each data value for the machine variable identifier, determining at least one second time series data stream, for each of one or more second time series data streams, determining a similarity measurement for the second time series data stream with respect to the first time series data stream, determining one or more most closely matching time series data streams, wherein the most closely matching time series data streams comprise the second time series data streams having the best similarity measurements with respect to the first time series data stream, and performing one or more maintenance operations based on the one or more most closely matching time series data streams.

15. The system of claim 14, further comprising:

scaling data values associated with the time series data entries of the first time series data stream.

16. The system of claim 14, further comprising:

scaling data values associated with the time series data entries of each second time series data stream.

17. The system of claim 14 wherein the query further comprises a range defined by a beginning time and an ending time, and wherein determining at least one second time series data stream comprises determining at least one second time series data stream within the range.

18. The system of claim 14 wherein the at least one second time series data entry is stored in an Extensible Markup Language (XML) based data structure in the processor-readable storage medium.

* * * * *